(12) United States Patent
Carr et al.

(10) Patent No.: US 11,280,214 B2
(45) Date of Patent: Mar. 22, 2022

(54) GAS TURBINE ENGINE COMPONENT

(71) Applicant: United Technologies Corporation, Hartford, CT (US)

(72) Inventors: Jesse M. Carr, Hartford, CT (US); Bryan P. Dube, Columbia, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1185 days.

(21) Appl. No.: 14/878,555

(22) Filed: Oct. 8, 2015

(65) Prior Publication Data

US 2016/0108755 A1 Apr. 21, 2016

Related U.S. Application Data

(60) Provisional application No. 62/065,953, filed on Oct. 20, 2014.

(51) Int. Cl.
*F01D 25/12* (2006.01)
*F01D 5/18* (2006.01)
*F01D 9/04* (2006.01)
*F23R 3/00* (2006.01)
*F02C 7/18* (2006.01)

(52) U.S. Cl.
CPC ............ *F01D 25/12* (2013.01); *F01D 5/186* (2013.01); *F01D 9/041* (2013.01); *F02C 7/18* (2013.01); *F23R 3/002* (2013.01); *F05D 2220/32* (2013.01); *F05D 2230/10* (2013.01); *F05D 2240/122* (2013.01); *F05D 2240/123* (2013.01); *F05D 2240/304* (2013.01); *F05D 2240/305* (2013.01); *F05D 2240/35* (2013.01); *F05D 2260/202* (2013.01); *F05D 2260/97* (2013.01); *F05D 2270/114* (2013.01); *F23R 2900/03042* (2013.01); *Y02T 50/60* (2013.01)

(58) Field of Classification Search
CPC .. F23R 2900/03041–03043; F23R 3/00; F23R 3/002; F23R 3/06; F05D 2260/202; F01D 5/186; F01D 5/187
See application file for complete search history.

(56) References Cited

U.S. PATENT DOCUMENTS 2,785,878 A * 3/1957 Conrad .................. F01D 25/08
138/38
3,584,972 A * 6/1971 Bratkovich ............ B21D 53/78
29/889.721
4,025,226 A 5/1977 Hovan
(Continued)

FOREIGN PATENT DOCUMENTS

DE 10244199 4/2004
EP 1262631 12/2002
(Continued)

OTHER PUBLICATIONS

Extended European Search Report for European Application No. 15190484.4 dated Mar. 23, 2016.

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A gas turbine engine component includes an exterior pressure side with a plurality of cooling holes located in the exterior pressure side. A relief cut surrounds at least one of the plurality of cooling holes.

7 Claims, 3 Drawing Sheets

(56) References Cited

U.S. PATENT DOCUMENTS

| | | | |
|---|---|---|---|
| 4,229,140 A | 10/1980 | Scott | |
| 4,303,374 A * | 12/1981 | Braddy | F01D 5/186 415/115 |
| 4,601,638 A * | 7/1986 | Hill | F01D 5/186 415/115 |
| 4,672,727 A * | 6/1987 | Field | B23P 15/02 29/527.2 |
| 4,737,613 A * | 4/1988 | Frye | B23K 26/0853 219/121.72 |
| 5,096,379 A * | 3/1992 | Stroud | F01D 5/186 416/97 R |
| 5,142,871 A * | 9/1992 | Lampes | F23R 3/10 60/756 |
| 5,402,159 A | 4/1995 | Green et al. | |
| 5,419,681 A * | 5/1995 | Lee | F01D 5/186 415/115 |
| 5,458,461 A * | 10/1995 | Lee | F01D 5/186 415/115 |
| 5,503,529 A * | 4/1996 | Anselmi | F01D 5/186 416/90 R |
| 5,651,662 A * | 7/1997 | Lee | F01D 5/186 416/95 |
| 5,660,525 A * | 8/1997 | Lee | F01D 5/186 416/96 R |
| 6,102,658 A | 8/2000 | Kvasnak et al. | |
| 6,155,778 A * | 12/2000 | Lee | F01D 5/20 415/116 |
| 6,213,714 B1 * | 4/2001 | Rhodes | F01D 5/186 416/96 R |
| 6,234,755 B1 * | 5/2001 | Bunker | F01D 5/186 416/241 R |
| 6,241,468 B1 * | 6/2001 | Lock | F01D 5/186 415/115 |
| 6,270,317 B1 * | 8/2001 | Manning | F01D 5/186 416/97 R |
| 6,422,819 B1 * | 7/2002 | Tsai | F01D 5/186 416/235 |
| 6,573,474 B1 * | 6/2003 | Loringer | F01D 5/186 219/121.71 |
| 7,160,084 B2 | 1/2007 | Ahmad | |
| 7,255,534 B2 * | 8/2007 | Liang | F01D 5/14 415/115 |
| 7,296,973 B2 * | 11/2007 | Lee | F01D 5/187 416/97 R |
| 7,513,739 B2 * | 4/2009 | Boury | F01D 5/187 415/115 |
| 7,841,083 B2 | 11/2010 | Alaux et al. | |
| 7,850,428 B2 * | 12/2010 | Tibbott | F01D 5/186 415/115 |
| 7,980,821 B1 | 7/2011 | Liang | |
| 8,057,182 B2 * | 11/2011 | Brittingham | F01D 5/186 415/115 |
| 8,105,030 B2 * | 1/2012 | Abdel-Messeh | F01D 5/187 415/115 |
| 8,261,810 B1 | 9/2012 | Liang | |
| 8,579,590 B2 | 11/2013 | Nadvit et al. | |
| 9,028,207 B2 * | 5/2015 | Zuniga | F01D 5/186 415/178 |
| 2004/0028527 A1 * | 2/2004 | Kohli | F01D 5/141 416/97 R |
| 2006/0073017 A1 | 4/2006 | Manning et al. | |
| 2008/0057271 A1 * | 3/2008 | Bunker | F01D 5/186 428/137 |
| 2010/0183429 A1 | 7/2010 | Liang | |
| 2010/0192588 A1 * | 8/2010 | Gerendas | F01D 5/186 60/752 |
| 2011/0305582 A1 * | 12/2011 | Lee | F01D 5/186 416/97 R |
| 2013/0039777 A1 * | 2/2013 | Piggush | F01D 5/186 416/97 R |
| 2014/0147285 A1 | 5/2014 | Salm et al. | |
| 2014/0271131 A1 | 9/2014 | Moody et al. | |

FOREIGN PATENT DOCUMENTS

| | | |
|---|---|---|
| EP | 1726782 | 11/2006 |
| EP | 2557270 | 2/2013 |
| EP | 2592229 | 5/2013 |
| WO | 8810017 | 12/1988 |

* cited by examiner

GAS TURBINE ENGINE COMPONENT

CROSS-REFERENCE TO RELATED APPLICATIONS

This application claims priority to U.S. Provisional Application No. 62/065,953 which was filed on Oct. 20, 2014 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Turbine airfoils frequently require active film and/or convection cooling at the trailing edge to keep temperatures in the wedge of material downstream of the trailing edge cavity within an acceptable range. This requires drilling or otherwise cutting holes or slots either directly into the center of the trailing edge or into the pressure (concave) side of the airfoil adjacent to the trailing edge. However, this approach can introduce cracks into the airfoil. Therefore, there is a need to cool a trailing edge of an airfoil without introducing cracks into the airfoil.

SUMMARY

In one exemplary embodiment, a gas turbine engine component includes an exterior pressure side with a plurality of cooling holes located in the exterior pressure side. A relief cut surrounds at least one of the plurality of cooling holes.

In a further embodiment of the above, the relief cut is elliptical and spaced from an adjacent relief cut.

In a further embodiment of any of the above, the component is an airfoil and the plurality of cooling holes are located adjacent a trailing edge of the airfoil.

In a further embodiment of any of the above, the relief cut extends between adjacent cooling holes of the plurality of cooling holes. The relief cut extends between 80% and 90% of a length of the airfoil.

In a further embodiment of any of the above, the relief cut is generally centered along the airfoil.

In a further embodiment of any of the above, the plurality of cooling holes are in communication with an internal cooling passage in the airfoil.

In a further embodiment of any of the above, the relief cut is spaced inward from opposing radial ends of the airfoil and is located upstream of the trailing edge.

In a further embodiment of any of the above, the component is a combustor wall.

In another exemplary embodiment, a gas turbine engine includes a turbine section that is configured to rotate about an axis of rotation. A combustor section and a component are located in at least one of the turbine section. The combustor section includes an exterior pressure side and a plurality of cooling holes located in the exterior pressure side. A relief cut surrounds at least one of the plurality of cooling holes.

In a further embodiment of any of the above, the relief cut is elliptical and spaced from an adjacent relief cut.

In a further embodiment of any of the above, the component is an airfoil and the plurality of cooling holes are located adjacent a trailing edge of the airfoil.

In a further embodiment of any of the above, the relief cut extends between adjacent cooling holes of the plurality of cooling holes. The relief cut extends between 80% and 90% of a length of the airfoil.

In a further embodiment of any of the above, the plurality of cooling holes are in communication with an internal cooling passage in the airfoil.

In a further embodiment of any of the above, the relief cut is spaced inward from opposing radial ends of the airfoil and is located upstream of the trailing edge.

In a further embodiment of any of the above, the component is a combustor wall of the combustor section.

In another exemplary embodiment, a method of forming a component includes forming a cooling hole in an exterior pressure side of a component and removing a portion of the exterior pressure side of the component to form a relief cut.

In a further embodiment of any of the above, the relief cut surrounds the cooling hole.

In a further embodiment of any of the above, the method includes reducing aerodynamic losses with a cooling film traveling over the relief cut.

In a further embodiment of any of the above, the method includes varying an amount of material removed by the relief cut to control heat transfer in the trailing edge of the component.

In a further embodiment of any of the above, the method includes removing an acute cross-section geometry adjacent the cooling hole when forming the relief cut.

DETAILED DESCRIPTION

Figure 1:
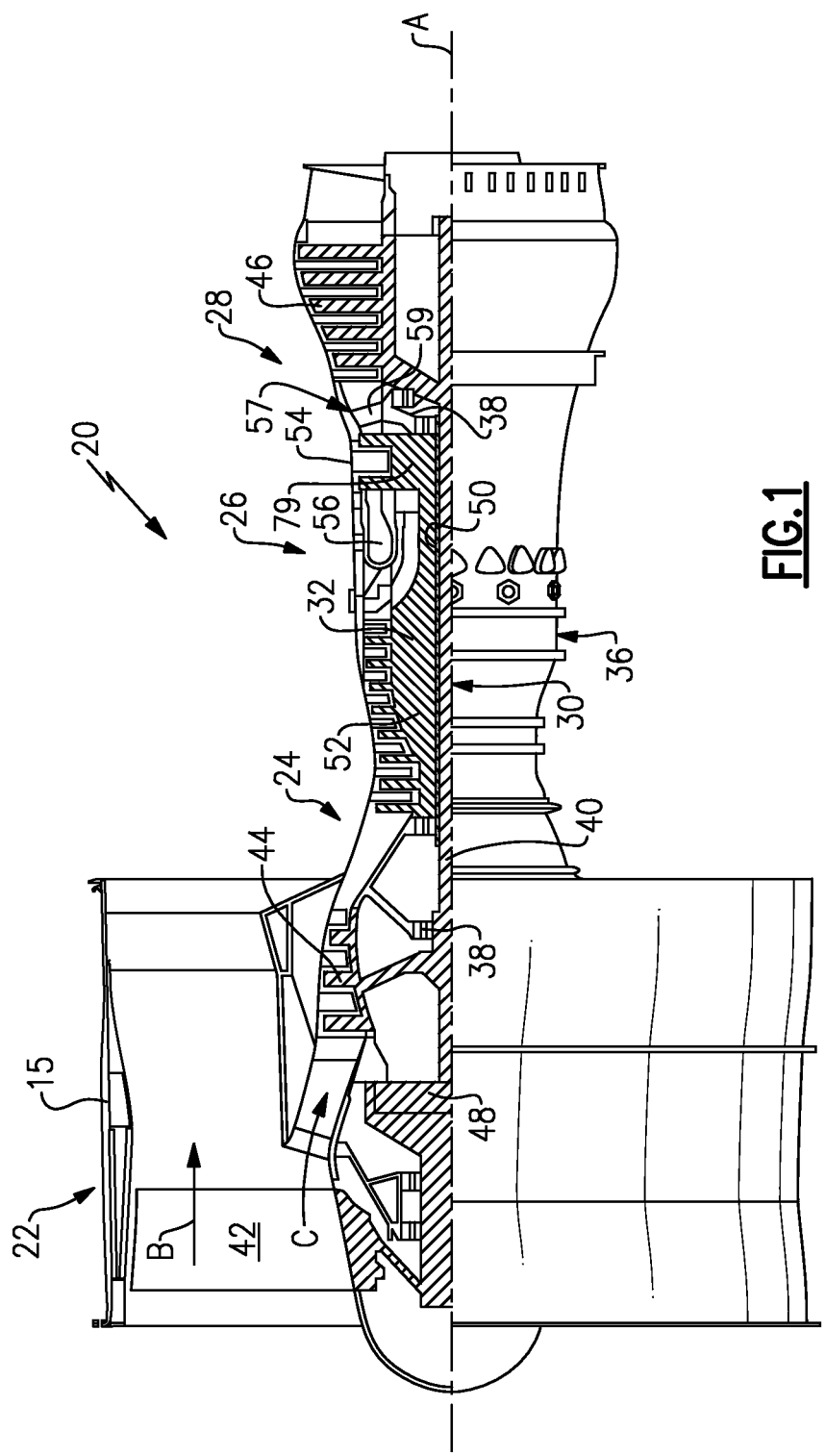
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figures 2, 4:
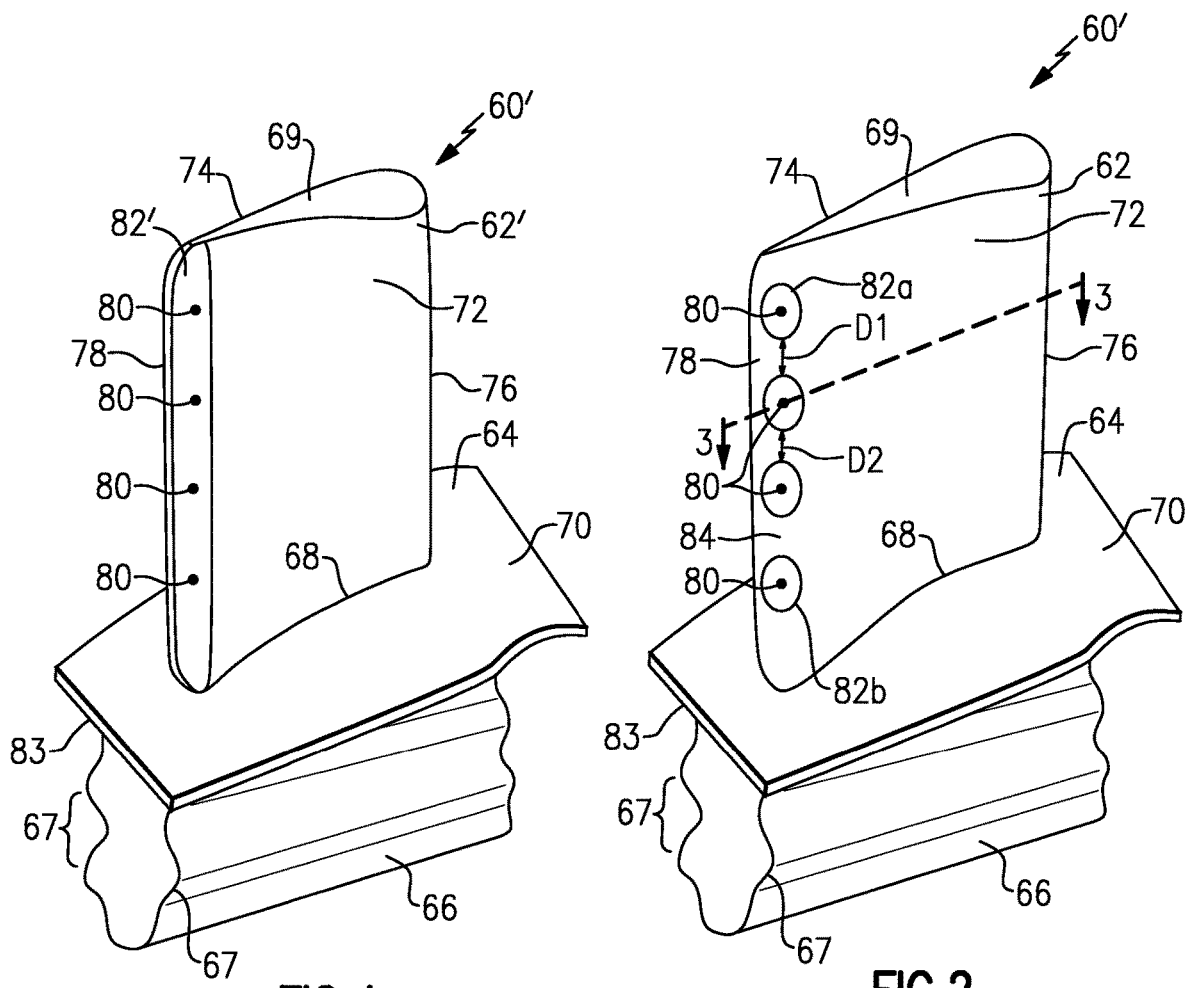
FIG. 2 is a perspective view of an example blade.
FIG. 4 is a perspective view of another example blade.

FIG. 2 illustrates an example airfoil structure 60 including an airfoil 62, a platform 64, and optionally a root portion 66. In the illustrated example, the airfoil structure 60 is a turbine blade. However, the airfoil structure 60 could also be a vane or a compressor blade. The airfoil structure 60 is configured to form a circumferential ring surrounding the engine axis A when jointed with additional similar airfoil structures 60. In this disclosure, circumferential or circumferentially spaced is relative to a circumference surrounding the engine axis A of the gas turbine engine 20 unless otherwise specified.

The airfoil 62 includes a pressure side 72 and a suction side 74 separated by a leading edge 76 and a trailing edge 78. The pressure side 72 of the airfoil structure 60 is generally concave and the opposing suction side 74 is generally convex. A first airfoil end 68 is rigidly attached to a radially outer side 70 of the platform 64 and a second airfoil end 69 is spaced from the platform 64 forming a free end. However, the second airfoil end 69 could also include a radially outer platform or tip shroud.

In the illustrated example, the airfoil 62 is formed integral with the platform 64 such that the airfoil 62 and the platform 64 form an integral or unitary piece. In another example, the airfoil 62 and the platform 64 could be formed separately and then attached to each other. In this disclosure, radial or radial direction is relative to the engine axis A of the gas turbine engine 20 unless otherwise specified.

The radially outer side 70 of the platform 64 forms a radially inner boundary for fluid traveling over the airfoil structure 60. The root portion 66 extends radially inward from the platform 64 to retain the airfoil structure 60 to a turbine rotor 79 (FIG. 1). The root portion 66 is located on an opposite side of the platform 64 from the airfoil 62 on a radially inner side 83. The root portion 66 includes ribs 67 located on opposite sides of the root portion 66 for engaging complimentary shaped receptacles on the turbine rotor 79 of the gas turbine engine 20.

As shown in FIG. 2, a plurality of cooling holes 80 located along the pressure side 72 adjacent and upstream from the trailing edge 78 of the airfoil 62. The cooling holes 80 have a circular cross section and are surrounded by a relief cut 82 having a generally scalloped cross section. Although the cooling holes 80 in the illustrated example are circular, other shapes such as elliptical holes, oval holes, oblong holes, and race-track shaped holes could be used. The cooling holes 80 are radially spaced along the airfoil 62 and extend in a generally downstream direction. In the illustrated example, each of the cooling holes 80 is surrounded by one of the relief cuts 82. However, there could be cooling holes 80 that are not surrounded by one of the relief cuts 82. Although the relief cut 82 is elliptical in the illustrated example, other shapes could be used. Additionally, the major and minor axis of the elliptical shape of the relief cut 82 could vary between adjacent relief cuts 82.

The adjacent relief cuts 82 are spaced from each other by a bridge member 84. The bridge member 84 includes a portion of the airfoil 62 that was not removed when the relief cuts 82 were formed. In the illustrated example, each of the relief cuts 82 have a generally identical shape and are evenly spaced from each other. However, a first pair of adjacent relief cuts 82 could be spaced apart by a distance D1 and a second pair of relief cuts 82 could be spaced by a distance D2, which could be greater than or less than the distance D1.

In one example, a relief cut distance between a radially outermost portion of a radially outermost relief cut 82a and a radially innermost portion of a radially innermost relief cut 82b is between 80% and 90% of a radial length of the airfoil 62. In another example, the relief cut distance is between 50% and 60% of the radial length of the airfoil 62. The relief cuts 82 are generally centered along the airfoil 62 such that a distance between the radially outermost relief cut 82a and a second airfoil end 69 is generally equal to a distance between the radially innermost relief cut 82b and the first airfoil end 68.

Figure 3:
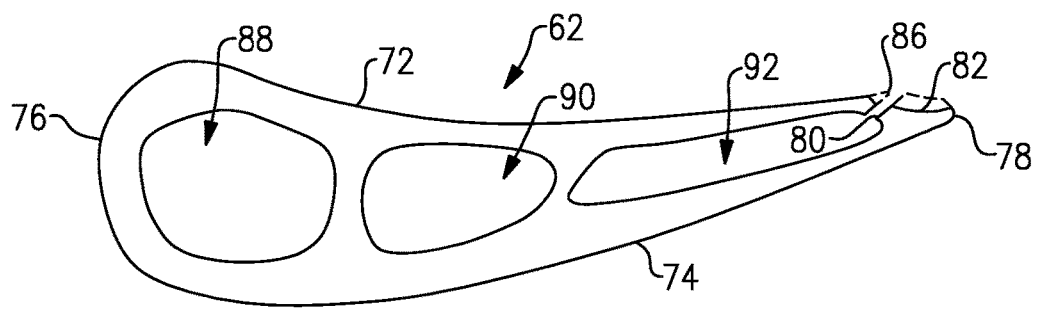
FIG. 3 is a cross-section view taken along line 3-3 of FIG. 2.

As shown in FIG. 3, the airfoil 62 includes internal cooling passages, such as a leading edge cooling passage 88, an intermediate cooling passage 90, and a trailing edge cooling passage 92. The trailing edge cooling passage 92 feeds cooling air into the cooling hole 80 to create a cooling film over the relief cut 82 as the cooling air travels out of the cooling hole 80 and along the pressure side 72 towards the trailing edge 78. The relief cut 82 also includes a curvilinear profile.

FIG. 4 illustrates another example airfoil structure 60'. The airfoil structure 60' is similar to the airfoil structure 60 except where described below or shown in the Figures. A relief cut 82' extends continuously between adjacent cooling holes 80.

In the illustrated example, the relief cut 82' extends approximately 100% of the radial length of the airfoil 62. In another example, the relief cut 82' extends approximately 80% to 90% of the radial length of the airfoil 62'. In yet another example, the relief cut 82' extends between approximately 50% and 60% of the radial length of the airfoil 62'. When the relief cut 82' extends less than 100% of the radial length of the airfoil 62, the relief cut 82' is generally centered along the airfoil 62' such that opposing edges of the relief cut 82' are equally spaced from the first airfoil end 68 and the second airfoil end 69, respectively. The relief cut 82' will have a generally curvilinear profile similar to the profile of the relief cut 82 shown in FIG. 3.

The cooling hole 80 in the airfoil 62 is formed by drilling or machining the pressure side 72 adjacent the trailing edge 78. Once the cooling hole 80 is formed, either of the relief cuts 82, 82' can be formed by machining or milling. However, it is possible that the relief 82 could be formed prior to the cooling hole 80. When forming the relief cut 82 in a scallop shape, the relief cut 82 is generally centered on the cooling hole 80. When forming the relief cut 82', the relief cut 82' generally extends along a substantial portion of the pressure side 72 adjacent the trailing edge 78 and is connected between adjacent cooling holes 80.

Both of the relief cuts 82, 82' remove an acute cross-section geometry 86 shown in hidden lines in FIG. 3 formed by the cooling hole 80. By removing the acute cross-section geometry 86 from adjacent the cooling hole 80, the magnitude of stress concentration adjacent the cooling hole 80 is reduced. By reducing the stress concentrations adjacent the trailing edge 78, the airfoil 62 may be made of more brittle materials that could not previously sustain the stress concentrations around the cooling holes 80 with the acute cross-section geometry.

The relief cuts 82, 82' are also beneficial in cooling the trailing edge 78 of the airfoil 62. In general, trailing edges of airfoils include a thicker wall dimension. The thicker walls of these trailing edges are more susceptible to operating at temperatures that are high then other portions of the airfoil. By varying the size of the relief cuts 82, 82' to remove additional material from the trailing edge 78 of the airfoil 62, the trailing edge 78 can be made thinner and be able to shed heat more easily. Additionally, the film of the cooling air exiting the cooling holes 80 reduces aerodynamic losses caused by the change in shape of the pressure side 72 from removing material to form the relief cuts 82, 82'.

Figure 5:
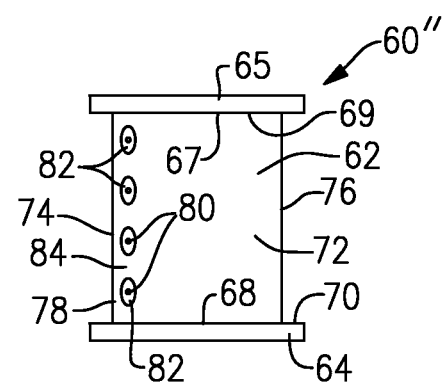
FIG. 5 is a side view of an example vane.

FIG. 5 illustrates another example airfoil structure 60". The airfoil structure 60" is similar to the airfoil structure 60 except where described below or shown in the Figures. In the illustrated example, the airfoil structure 60" is a vane.

The airfoil structure 60" includes a radially outer platform 65 located adjacent the second airfoil end 69. The radially outer platform 65 includes a radially inward facing surface 67 that forms a radially outer boundary for fluid traveling over the airfoil structure 60".

Figure 6:
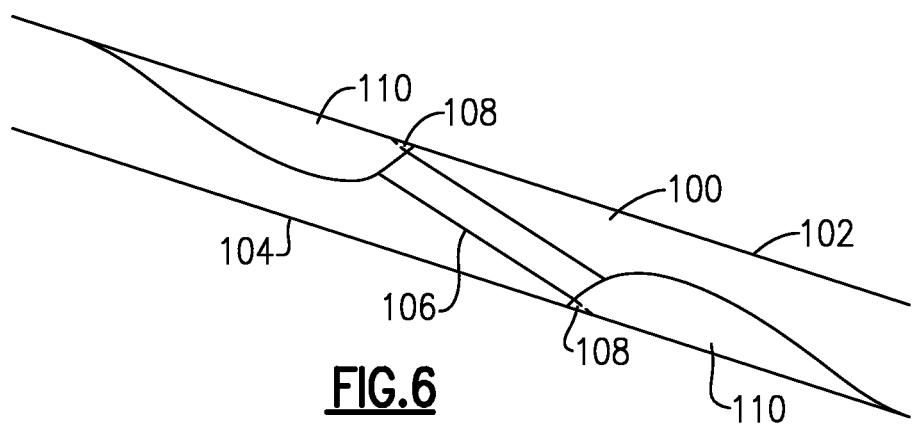
FIG. 6 is a cross-section view of an example combustor.

FIG. 6 illustrates example combustor wall 100 of the combustor section 26. The combustor wall 100 includes an interior surface 102 and an exterior pressure side surface 104. A cooling hole 106 extends generally transverse to the interior surface 102 and the exterior pressure side surface 104.

When the cooling hole 106 is formed in the combustor wall 100, an acute cross-section geometry 108 is formed between the cooling hole 106 and the interior surface 102 and the exterior pressure side surface 104. A relief cut 110 is made in both the interior surface 102 and the exterior pressure side surface 104 to remove the acute cross-section geometry 108.

By removing the acute cross-section geometry 180 from adjacent the cooling hole 106, the magnitude of stress concentration adjacent the cooling hole 106 is reduced. By reducing the stress concentrations adjacent the cooling hole 106, the airfoil combustor wall 100 may be made of more brittle materials that could not previously sustain the stress concentrations around the cooling holes 106 with the acute cross-section geometry 108.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:
1. A gas turbine engine component comprising:
   an airfoil including
      an exterior pressure side;
      a plurality of cooling holes located in the exterior pressure side along a trailing edge of the airfoil; and
      a plurality of relief cuts surrounding a corresponding one of the plurality of cooling holes, wherein the plurality of relief cuts are elliptical and spaced from an adjacent relief cut of the plurality of relief cuts;

wherein the airfoil includes a leading edge cooling passage, an intermediate cooling passage, and a trailing edge cooling passage and the plurality of cooling holes are in fluid communication with the trailing edge cooling passage and the plurality of cooling holes are the downstream most cooling holes on the pressure side of the airfoil.

2. The component of claim 1, wherein the plurality of cooling holes are in communication with an internal cooling passage in the airfoil and a perimeter of each of the plurality of relief cuts form a non-acute cross-sectional geometry with the exterior pressure side.

3. The component of claim 1, wherein the plurality of relief cuts are spaced inward from opposing radial ends of the airfoil and is located upstream of the trailing edge.

4. The component of claim 1, wherein the plurality of relief cuts are scalloped in cross section.

5. A combustor for a gas turbine engine comprising:
a combustor wall including:
an exterior pressure side surface;
an interior surface;
a plurality of cooling holes extending from the interior surface to the exterior pressure side surface, wherein the plurality of cooling holes extend through a thickness of the combustor wall;
an interior surface relief cut in the interior surface surrounding at least one of the plurality of cooling holes, wherein a perimeter of the interior surface relief cut forms a non-acute cross-sectional geometry with the interior surface; and
an exterior pressure side surface relief cut in the exterior pressure side surface surrounding the at least one of the plurality of cooling holes wherein a perimeter of the exterior pressure side surface relief cut forms a non-acute cross-sectional geometry with the exterior pressure side surface.

6. The combustor of claim 5, wherein the plurality of cooling holes extend in a non-perpendicular direction relative to the exterior pressure side surface and the interior surface.

7. The combustor of claim 6, wherein the interior surface relief cut is arranged in the combustor wall in a non-overlapping configuration with the exterior pressure side relief cut and the interior surface relief cut is separated from the exterior pressure side relief cut by a length of a corresponding one of the plurality of cooling holes.

* * * * *